US007516900B2

(12) United States Patent
Janczek

(10) Patent No.: US 7,516,900 B2
(45) Date of Patent: Apr. 14, 2009

(54) DATA CARRIER

(75) Inventor: Thies Janczek, Molfsee (DE)

(73) Assignee: Thies Zanczek, Molfsee (DE)

( * ) Notice: Subject to any disclaimer, the term of this patent is extended or adjusted under 35 U.S.C. 154(b) by 222 days.

(21) Appl. No.: 11/585,102

(22) Filed: Oct. 24, 2006

(65) Prior Publication Data
US 2007/0125865 A1    Jun. 7, 2007

(51) Int. Cl.
*G06K 19/00* (2006.01)

(52) U.S. Cl. ..................... 235/487; 235/493

(58) Field of Classification Search .......... 235/487, 235/488, 492, 493, 494, 495
See application file for complete search history.

(56) References Cited

U.S. PATENT DOCUMENTS

| | | | | |
|---|---|---|---|---|
| 3,230,650 | A * | 1/1966 | Orkin | 283/107 |
| 3,283,713 | A * | 11/1966 | Wooster | 283/98 |
| 3,583,317 | A * | 6/1971 | Gibson | 283/98 |
| 3,822,492 | A * | 7/1974 | Crawley | 40/638 |
| 3,950,013 | A * | 4/1976 | Tagliaferri | 283/100 |
| 4,620,727 | A * | 11/1986 | Stockburger et al. | 283/82 |
| 4,643,455 | A * | 2/1987 | North et al. | 283/81 |
| 5,531,482 | A * | 7/1996 | Blank | 283/67 |
| 5,735,550 | A * | 4/1998 | Hinkle | 283/108 |
| 5,997,042 | A * | 12/1999 | Blank | 283/61 |
| 6,089,611 | A * | 7/2000 | Blank | 283/67 |
| 6,161,870 | A * | 12/2000 | Blank | 283/75 |
| 6,179,337 | B1 * | 1/2001 | Zumberge | 283/81 |
| 6,386,591 | B1 * | 5/2002 | Blank | 283/75 |
| 6,827,373 | B2 * | 12/2004 | Zumberge | 283/81 |
| 2002/0089171 | A1 * | 7/2002 | Silvestre | 283/61 |

FOREIGN PATENT DOCUMENTS

| | | |
|---|---|---|
| DE | 196 07 363 A1 | 9/1996 |
| DE | 197 16 099 A1 | 10/1998 |
| DE | 198 51 836 A1 | 3/2000 |
| DE | 200 17 161 U1 | 1/2001 |
| DE | 101 24 327 A1 | 11/2002 |

* cited by examiner

*Primary Examiner*—Daniel A Hess
*Assistant Examiner*—Paultep Savusdiphol
(74) *Attorney, Agent, or Firm*—Birch, Stewart, Kolasch & Birch, LLP

(57) ABSTRACT

A data carrier including a flat carrier element having at least one memory segment configured to store user-specific information and at least one inscription segment configured to store visually readable information. Further, the carrier element further includes a multi-information segment having a plurality of information layers arranged one on top of another, and at least two information layers are writable and/or printable and at least one top information layer is made separable from a neighboring lower information layer.

18 Claims, 3 Drawing Sheets

DATA CARRIER

The present application claims priority to German Application DE 20-2005-01015341, filed on Oct. 27, 2005, the entire contents of which is hereby incorporated by reference in its entirety.

BACKGROUND OF THE INVENTION

1. Field of the Invention

The present invention relates to a data carrier such as a credit card or bank cark including at least one removable information layer.

2. Description of the Related Art

German Patent Application DE 197 16 099 A1 discloses a card-shaped data carrier having printed information that is covered by a plastic film. However, the information printed on the card is limited to information provided by the manufacturer of the card. In addition, German Patent Application DE 198 51 836 A1 discloses a card-shaped data carrier having a thermoreversible layer applied sequentially to produce visible information. The information is limited to an area of an inscription segment including the information.

German Patent Application DE 200 17 161 U1 discloses a card-shaped data carrier having a plurality of inscription segments including visually readable information. The number and size of the inscription fields, however, are limited by the size of the data carrier. German Patent Application DE 196 07 363 A1 discloses a card-shaped data carrier including an integrated chip storing user-specific information. However, to read the user-specific information, a separate electrical card reader is required.

German Patent Application DE 101 24 327 A1 discloses a data carrier having a magnetic strip for storing user-specific information and having visually readable information such as an account number, customer number, card issuer, etc. To increase the amount of information provided on the data carrier, another inscription segment including a barcode is glued over the memory segment. However, to prevent an interaction between the electromagnetic memory segment and the inscription segment, the manufacturing costs of this data carrier is increased.

SUMMARY OF THE INVENTION

Accordingly, one object of the present invention is to address the above-noted and other problems.

Another object of the present invention is to provide a data carrier that includes separable and removable information layers.

To achieve these and other advantages and in accordance with the purpose of the present invention, as embodied and broadly described herein, the present invention provides in one aspect a novel flat carrier element having at least one memory segment configured to store user-specific information and at least one inscription segment configured to store visually readable information. Further, the carrier element further includes a multi-information segment having a plurality of information layers arranged one on top of another, and at least two information layers are writable and or printable and at least one top information layer is made separable from a neighboring lower information layer.

In another aspect, the present invention provides a novel consumer account card including a first section having consumer account information, and a second section having a multi-information segment with a plurality of removable information layers arranged one on top of another.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 6b is a side view of the holding frame illustrating in FIG. 6a; and

FIG. 6c is a bottom view of the holding frame illustrated in FIG. 6a.

DETAILED DESCRIPTION OF THE PREFERRED EMBODIMENTS

Reference will now be made in detail to the preferred embodiments of the present invention, examples of which are illustrated in the accompanying drawings.

Figure 1:
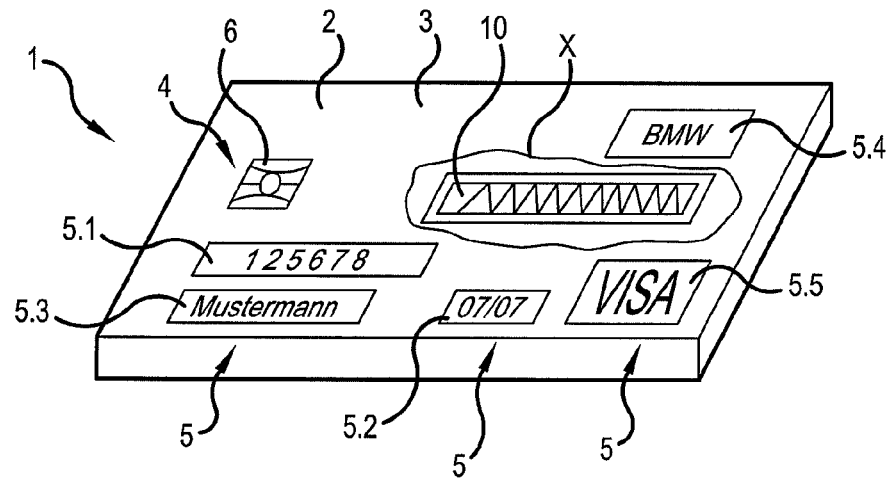
FIG. 1 is a perspective view illustrating a data carrier according to an embodiment of the present invention.

Turning first to FIG. 1, which illustrate a data carrier 1 according to an embodiment of the present invention. In this example, the data carrier 1 has dimensions according to the ISO Standard 7816. The data carrier can be used as a credit card, customer card, bankcard, etc.

As shown in FIG. 1, the data carrier 1 has a carrier element or carrier layer 2 including at least one plastic or paper/cardboard layer. Further, the carrier layer 2 can be produced by laminating several plastic or paper layers. Alternatively, the carrier layer 2 can be produced using a plastic injection molding process.

The data carrier 1 also includes a memory segment 4 and one or more inscription segments 5 arranged on a flat top side 3 of the carrier layer 2. In addition, the memory segment 4 is a chip module including a semiconductor chip embedded in the carrier layer 2. Also, contact areas 6 of the chip module are made flush with the top side 3 of the carrier layer 2. Further, the semiconductor chip stores user-specific information such as a number of the card, a name of the card holder, etc.

Figure 3:
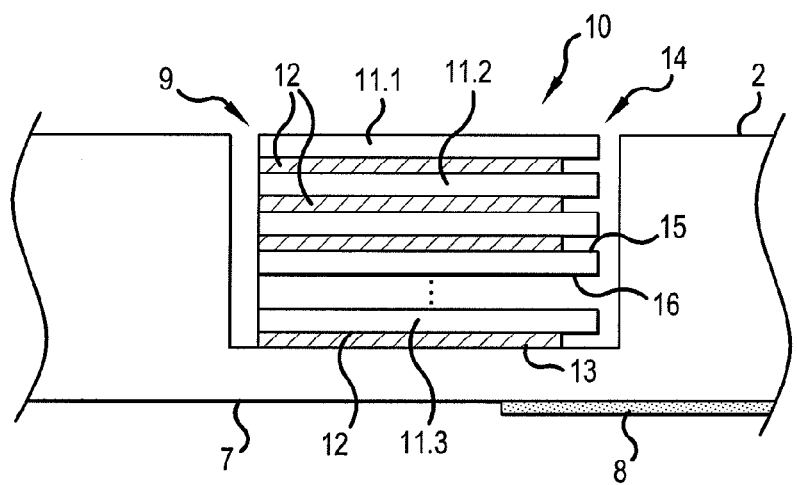
FIG. 3 is a cross-sectional view illustrating a multi-information segment of the data carrier shown in FIG. 1.

As shown in FIG. 3, the data carrier 1 also includes a magnetic strip 8 applied to a bottom side 7 of the carrier layer 2. Similar to the semiconductor chip included in the memory segment 4, the magnetic strip 8 also stores information such as the number of the card, the name of the account holder, etc.

As shown in FIG. 1, the inscription segments 5 include, for example, a card number field 5.1 including a number of the card, a card expiration field 5.2 including an expiration data of the card, a card holder field 5.3 including a name of the card holder, a card issuer field 5.4 including a name of the card issuer, and a field 5.5 including the name of the transaction-processing company (e.g., VISA). The fields 5.1, 5.2, 5.3, 5.4 and 5.5 include embossed or printed information.

Figure 2:
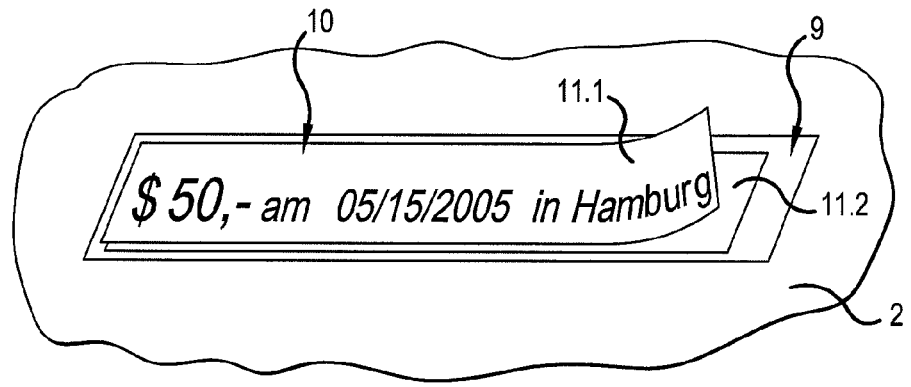
FIG. 2 is an enlarged view illustrating a portion of the data carrier shown in FIG. 1.

Further, with reference to FIGS. 2 and 3, the data carrier 1 also includes a recess 9 formed on a free area of the carrier layer 2. As shown, the recess 9 includes a multi-information segment 10 having a plurality of information layers 11 arranged one above another. Further, the information layers 11 lie flush against each other and include in one example visually writable or printable information.

In addition, the information layers 11 are preferably made as information strips each having a same dimension (e.g., the same width, length, and height). The dimension of the information layers 11 is preferably selected so the layers 11 can be inserted with minimal play in the recess 9. Further, the multi-information segment 10 includes, for example, ten to twenty information layers 11 in which a top information layer 11.1 (see FIG. 2) terminates flush to the top side 3 of the carrier layer 2. In addition, the information layers 11 may be a paper or plastic film material (e.g., PET material), each having a similar thickness in the range of 10 to 60 μm.

Further, as shown in FIG. 3, each information layer 11 includes an adhesive layer 12 such that a top information layer is attached to a neighboring lower information layer. In addition, the lowest information layer of the multi-information segment 10 is attached adheringly by the adhesive layer 12 to a bottom area 13 of the recess 9. For example, the information layer 11.2 is attached to the information layer 11.1 and the lowest information layer 11.3 is attached to the bottom area 13 of the recess 9 via the adhesive 12.

Also, in the example shown in FIG. 3, the adhesive layer 12 extends over a large surface area of a respective information layer 11 without extending to a narrow side 14 of the information layer 11. Thus, a corresponding information layer 11 can be easily grasped and individually pulled off from an underlying information layer.

In addition, in one embodiment of the present invention, the information layers 11 may include information printed by the card issuer on a top side 15 or a back side 16. The printed information may include, for example, advertising messages, discount promotions, coupons, etc. For example, the back side 16 of the information layer 11 may include a printed logo of the card issuer.

Thus, according to an embodiment of the present invention, the data carrier 1 includes a plurality of separable information layers 11, each of which can contain card issuer-related information. Also, when all of the information layers 11 have been used, another multi-information segment 10 with updated information layers 11 can be inserted into the recess 9 in a simple manner (e.g., by using the adhesive film 12 on the bottom side 13 of the recess 9).

In addition, in another embodiment and as shown in FIG. 2, the information layers 11 can be blank. In this embodiment, the cardholder can use the individual information layers 11 to write notes or memos. For example, the card holder can record an amount of each transaction on the individual information layers 11. FIG. 2 illustrates an example in which the card holder records the amount of $50 charged on May 15, 2005 in Hamburg on the top information layer 11.1. As discussed above, because the information layers 11 include a corresponding adhesive layer 12, the card holder can pull off the top information strip 11.1 from the lower information strip 11.2 and then affix it again at another location. Thus, the card holder can use the recorded information layer 11.1 as a memory aid.

Figure 4:
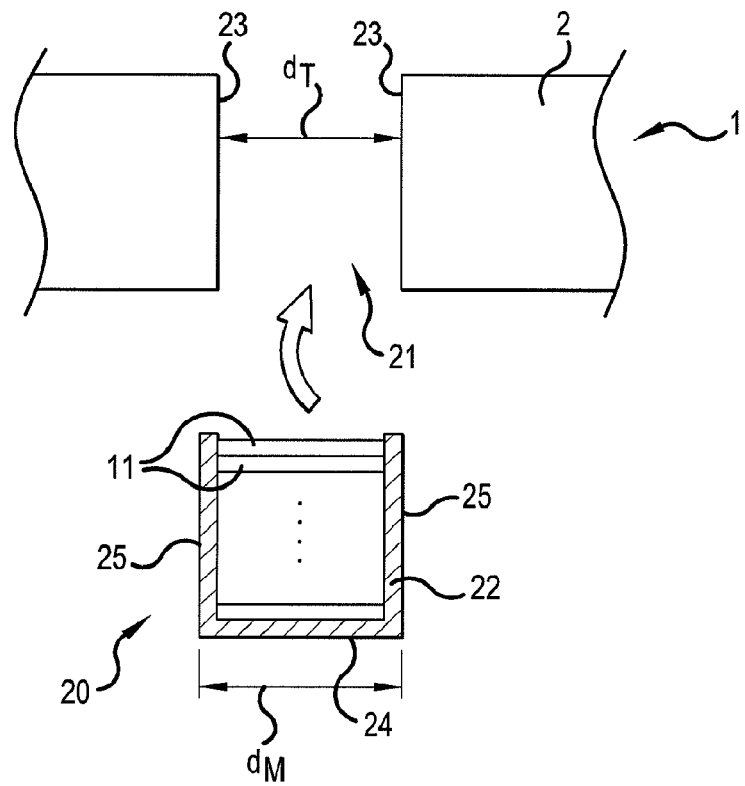
FIG. 4 is a cross-sectional view illustrating a data carrier according to another embodiment of the present invention.

Turning now to FIG. 4, which is a cross-sectional view of the recess 9 in FIGS. 2 and 3 being replaced with a through cutout 21 according to an embodiment of the present invention. The cutout 21 is preferably made using a punching process when the data carrier 1 is manufactured. In this embodiment, the data carrier 1 includes a multi-information segment 20 having a holding frame 22 made of a flexible plastic material, for example.

In addition, an inside distance $d_T$ between opposite narrow sides 23 of the carrier layer 2 is made slightly smaller than a distance $d_M$ of the holding frame 22 so the holding frame 22 is held grippingly in the cutout 21. Further, as shown in FIG. 4, the holding frame 22 has a cup-shape including a bottom portion 24 and upright sidewalls 25 extending at edges of the bottom portion 24. Further, the height of the sidewalls 25 and the thickness of the bottom portion 24 correspond to the thickness of carrier layer 2 so that the multi-information segment 20 in the mounted position is flush to the top side 3 and the bottom side 7 of the data carrier 1.

Figure 5:
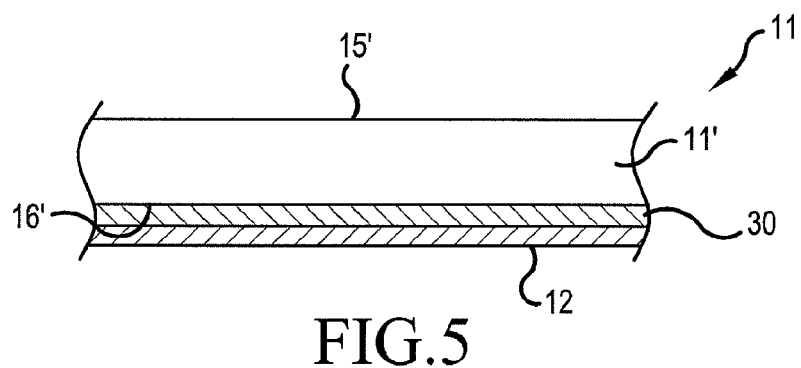
FIG. 5 is an enlarged cross-sectional view illustrating a portion of the data carrier shown in FIG. 4.

Next, FIG. 5 illustrates the information layer 11 including an information carrier 11', whose top side 15' is used, for example, for inscription by the card holder. Further, the back side 16' of the information carrier 11' includes printed information 30. In more detail, the printed information 30 includes several tiers of printing ink preferably having a highly opaque white layer to increase the contrast of the printing.

In addition, as discussed above, the information layer 11 includes the adhesive layer 12 provided on the printing information 30. In this embodiment, the adhesive layer 12 preferable is colored white to increase its contrast or opacity so to allow the printed layer 30 to show through. The adhesive layer 12 can also be made to have any other color.

Figure 6A:
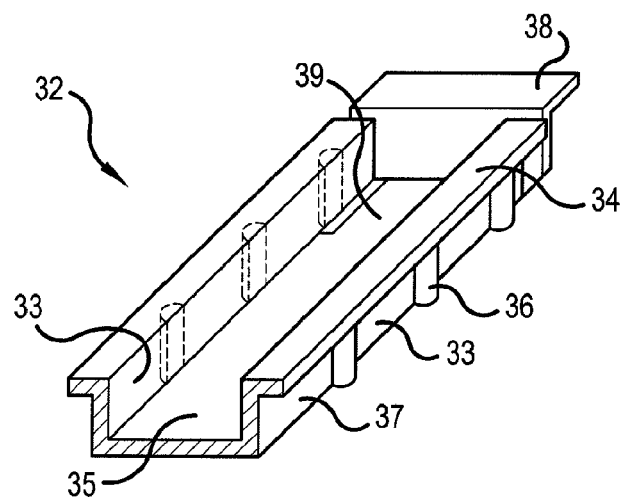
FIG. 6a is a perspective front view of a holding frame for a data carrier according to another embodiment of the present invention.
Figure 6B:
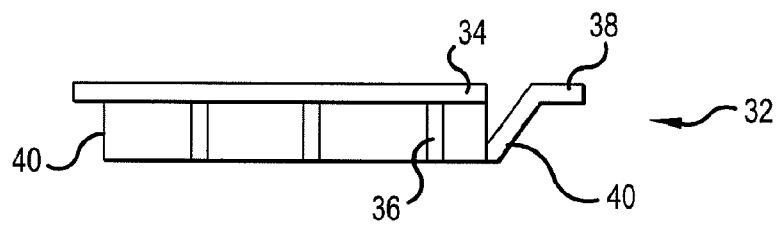
Figure 6C:
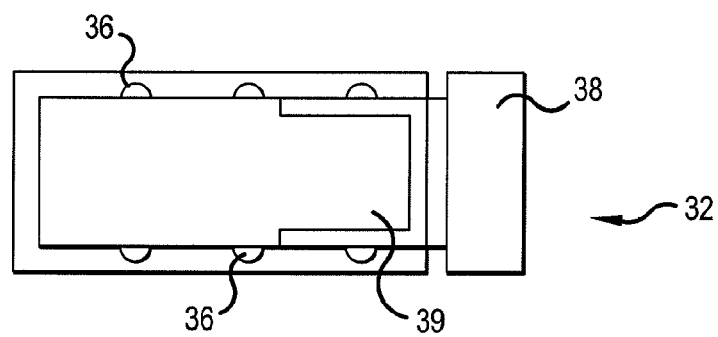

Turning next to FIGS. 6(a)-(c), which illustrates a through shaped holding frame 32 used instead of the holding frame 22 in FIGS. 4 and 5. In this embodiment and as shown in FIG. 6(a), the holding frame 32 includes edge bars 34 projecting at a right angle at least on free sides of sidewalls 33 of the holding frame 32. Further, the edge bars 34 can also be arranged circumferentially. In addition, in the embodiment shown in FIG. 6(a), the holding frame 32 includes only two opposite sidewalls 33 extending in the longitudinal direction of the holding frame 32 and being perpendicular from a bottom portion 35 of the holding frame 32. Also, the edge bars 34 run parallel to the bottom portion 35 and preferably have a length of 0.15 mm to 0.25 mm.

In addition, as shown in FIGS. 6(a) and 6(b), the holding frame 32 also includes a plurality of fixation/stabilization braces 36 extending in the longitudinal direction of the rectangular holding frame 32. As shown in FIG. 6(a), the braces 36 are spaced a certain distance from each other and extend perpendicular to the bottom portion 35 on an outer side 37 of the sidewalls 33. Further, as shown in FIG. 6(b), the fixation/stabilization braces 36 extend from a level of the bottom portion 35 directly to a bottom side of the edge bar 34. Thus, the braces 36 enable a simplified fixation of the holding frame 32 in the cutout 21 of the data carrier 1.

In addition, as shown in FIGS. 6(a)-(c), the holding frame 32 further includes a tension element 38 extending at the level of the edge bar 34 parallel to the bottom portion 35 or the edge bar 34. Further, the tension element 38 is connected via a film hinge to the bottom portion 35 of the holding frame 32. In addition, the tension element 38 is pressed into the cut out 21 together with the holding frame 32 and is fixed with the holding frame 32 by adhesion in the cutout 21.

Further, as shown FIGS. 6(a) and 6(c), the bottom portion 35 has a free cutout section 39 on a side facing the tension element 38. Thus, in the embodiments shown in FIGS. 4 and 5 including the cutout 21, the bottom portion 35 forms a sub-region of the bottom side 7 of the data carrier 1. Thus, a user can press the bottom portion 35 near the free cutout section 39 to push a top most information layer 11 from the top side 3 of the data carrier 1. Therefore, the user can easily peel off the top most information layer 11.

In addition, as shown in FIG. 6(b), the holding frame 32 includes undercuts 40 at the lower corner regions of the sidewalls 33 or the bottom portion 35. Thus, the holding frame 32 can be fixed in a simple manner in the cutout 21 of the data carrier 1. In addition, the holding frame 32 is preferably made as a stable and flexible plastic injection-molded part. For example, the plastic material may be thermoplastic elastomer (TPE) with a wall thickness of 0.15 mm to 0.25 mm. Further, the holding frame 32 includes a length of 40 mm and a width of 15 mm, for example.

Thus, in accordance with embodiments of the present invention, an additional multi-information segment is provided on the carrier element. The multi-information segment includes at least two information layers arranged one on top of another and which can include printed information or can be blank so a user can write notes on the information layers. That is, the information layers can contain advertising messages, discount strips, or coupons from a card issuer. Therefore, the card holder can view and redeem the information material provided on each information layer.

Each layer may include, for example, a different inscription such that a plurality of advertisement message, discount strips or coupons may be provided to the card holder. Alternatively, the information layers may be blank. The card holder can use the individual note layers to take notes, such as, for example, writing a payment amount for a transaction, when the data carrier is used as a bankcard or credit card.

In addition, as the multi-information segment may be manufactured as a separate semi-finished product and retained adheringly to the carrier element of the data carrier. As discussed above, the carrier element may include a recess configured to receive the multi-information segment in such a manner that a top information layer is preferably arranged flush with a top surface of the carrier element.

In addition, the present invention is particularly advantageous because simple manufacturing methods may be used to form the card. For example, the card may be manufactured to include a cut through via a punching process or to include a recess via a routing process. Further, the multi-information segment may be in the form of a "booklet" that is sold by the card issuer and is simply attached by the customer himself to the carrier element That is, a new card does not have to be issued each time the user refills the multi-information segment.

In addition, as described above, the recess of the carrier element can be made as a depression, whereby a lowest tier of the information layers is attached adheringly to a bottom surface of the depression. This enables simple attachment of the multi-information segment to be simply attached to the data carrier. Further, the recess in the carrier element can also be made by a through cutout, which is advantageously achieved by a punching process. The multi-information segment is then preferably retained via a flexible holding frame on narrow sides of the cutout.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data carrier, comprising:
    a flat carrier element having at least one memory segment configured to store user-specific information and at least one inscription segment configured to store visually readable information,
    wherein the carrier element further includes a multi-information segment having a plurality of information layers arranged one on top of another,
    wherein at least three information layers are writable and/or printable and at least a top information layer is made separable from a neighboring lower information layer, and
    wherein the carrier element further includes a recess configured to receive the multi-information segment such that the multi-information segment is arranged nearly flush with the carrier element.

2. The data carrier according to claim 1, wherein the multi-information segment is manufactured as a separate semi-finished product and is joined adheringly with the carrier element.

3. The data carrier according to claim 1, wherein the recess is a depression, on whose bottom area is adheringly attached a lowest information layer of the information layers included in the multi-information segment.

4. The data carrier according to claim 1, wherein the recess is a through cutout in which the multi-information segment is retained by a holding frame extending at a periphery of the information layers.

5. The data carrier according to claim 1, wherein a backside of the information layers include an adhesive layer.

6. The data carrier according to claim 5, wherein the adhesive layer is formed substantially over an entire surface of the backside of the information layers except a narrow edge portion such that the information layers are attached to each other and may be separated from each other by manually pulling on a respective information layer.

7. The data carrier according to claim 1, wherein the information layers comprise a writable and/or printable plastic film or paper material.

8. The data carrier according to claim 1, wherein a backside of the information layers is printed with information.

9. The data carrier according to claim 1, wherein the multi-information segment includes at least ten information layers, each information layer having a thickness in a range of 10 μm to 60 μm.

10. The data carrier according to claim 1, wherein the memory segment is at least one from a magnetic strip and a chip.

11. The data carrier according to claim 1, wherein the inscription segment includes at least one from a card number field, a card expiration field, a card holder field, a card issuer field, and a field for showing a transaction-processing company.

12. A consumer account card, comprising:
    a first section including consumer account information;
    a second section including a multi-information segment having a plurality of removable information layers arranged one on top of another; and
    a recess configured to receive the multi-information segment such that the multi-information segment is arranged nearly flush with bottom and top surfaces of the consumer account card, wherein at least three information layers are writable and/or printable and at least a top information layer is made separable from a neighboring lower information layer.

13. The consumer account card according to claim 12, wherein the information layers contain printed advertisement information or are blank.

14. The consumer account card according to claim 12, wherein the recess is a through cutout in which the multi-information segment is retained by a holding frame extending at a periphery of the information layers.

15. The consumer account card according to claim 12, further comprising:
an adhesive layer formed on a partial area of backside of the information layers such that the information layers are attached to each other and may be separated from each other by manually pulling on a respective information layer.

16. The consumer account card according to claim 12, wherein a backside of the information layers is printed with information.

17. The consumer account card according to claim 12, wherein the consumer account information in the first section includes at least one from a card number field, a card expiration field, a card holder field, a card issuer field, and a field for showing a transaction-processing company.

18. The consumer account card according to claim 12, further comprising:
at least one memory segment configured to store consumer-specific information.

* * * * *

UNITED STATES PATENT AND TRADEMARK OFFICE
CERTIFICATE OF CORRECTION

PATENT NO. : 7,516,900 B2  Page 1 of 1
APPLICATION NO. : 11/585102
DATED : April 14, 2009
INVENTOR(S) : Thies Janczek It is certified that error appears in the above-identified patent and that said Letters Patent is hereby corrected as shown below:

Title Page, Item (73) Assignee is deleted
(73) ~~Thies Zanczek, Molfsee (DE)~~

Signed and Sealed this

Thirtieth Day of March, 2010

David J. Kappos
*Director of the United States Patent and Trademark Office*